US012675405B2

(12) United States Patent
Agarwal et al.

(10) Patent No.: US 12,675,405 B2
(45) Date of Patent: Jul. 7, 2026

(54) DIFFERENTIATED QOS IN PARALLEL CACHED RAS CHANNELS IN MEMORY DEVICES

(71) Applicant: Micron Technology, Inc., Boise, ID (US)

(72) Inventors: Nikesh Agarwal, Boise, ID (US); Chandana Manjula Linganna, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/444,552

(22) Filed: Feb. 16, 2024

(65) Prior Publication Data

US 2024/0330182 A1 Oct. 3, 2024

Related U.S. Application Data

(60) Provisional application No. 63/485,789, filed on Feb. 17, 2023.

(51) Int. Cl.
*G06F 12/08* (2016.01)
*G06F 12/0802* (2016.01)

(52) U.S. Cl.
CPC ................................ *G06F 12/0802* (2013.01)

(58) Field of Classification Search
CPC .................................................. G06F 12/0802
See application file for complete search history.

(56) References Cited

U.S. PATENT DOCUMENTS

| 6,813,249 B1 * | 11/2004 | Lauffenburger | ........ H04L 47/28 |
| | | | 370/412 |
| 10,198,354 B2 * | 2/2019 | Chen | .................... G06F 12/0808 |
| 11,443,479 B1 * | 9/2022 | Yeung | ..................... G06T 15/04 |
| 2016/0283112 A1 * | 9/2016 | Blankenship | ....... G06F 12/0802 |
| 2018/0276124 A1 * | 9/2018 | Chen | ...................... G06F 3/0685 |
| 2019/0205244 A1 * | 7/2019 | Smith | ..................... G06F 3/065 |
| 2019/0243700 A1 * | 8/2019 | Brewer | .................. H04L 69/12 |
| 2020/0327084 A1 * | 10/2020 | Choudhary | ......... G06F 12/0875 |
| 2024/0241829 A1 * | 7/2024 | Ma | ...................... G06F 12/0828 |
| 2024/0345982 A1 * | 10/2024 | Agarwal | ............. G06F 13/1642 |

OTHER PUBLICATIONS

Solomon, Richard, "RAS Data Protection for PCI Express Designs". https://www.synopsys.com/articles/ras-data-protection.html#2 (Year: 2015).*

* cited by examiner

*Primary Examiner* — Tasnima Matin
(74) *Attorney, Agent, or Firm* — WOOD IP LLC; Theodore A. Wood

(57) ABSTRACT

A memory device comprises a plurality of backend interfaces that are each configured to connect to a respective media device (e.g., DDR, LPDDR DRAM), a plurality of reliability, availability and serviceability (RAS) channel datapaths with each RAS channel datapath connected to one or more backend interfaces, one or more caches that are each connected to at least one RAS channel datapath, and control circuitry. The control circuitry is configured to: in response to receiving a memory access request for a memory location, search a cache of the one or more caches for the requested memory location; and when, in response to the search, the requested memory location is not found in the cache, obtain the requested memory location from a media device connected to the at least one RAS channel datapath. Corresponding methods are also described.

17 Claims, 10 Drawing Sheets

200

260

504 — 502

| Field | Width (bits) | | |
|---|---|---|---|
| | 64B Flit | 256B Flit | 512B Flit |
| Valid | | 1 | |
| MemOpcode | | 4 | |
| SnpType | | 3 | |
| MetaField | | 2 | |
| MetaValue | | 2 | |
| Tag | | 16 | |
| Address[5] | 1 | | 0 |
| Address[51:6] | | 46 | |
| LD-ID[3:0] | 4 | | 0 |
| SPID | 0 | | 12 |
| DPID | 0 | | 12 |
| RSVD | 6 | 20 | |
| TC | | 2 | |
| Total | 87 | 1-- | 120 |

VC_NUM — 506   [ 3 bits ]

512 — 514

| Field | Width (bits) | | |
|---|---|---|---|
| | 64B Flit | 256B Flit | 512B Flit |
| Valid | | 1 | |
| MemOpcode | | 4 | |
| SnpType | | 3 | |
| MetaField | | 2 | |
| MetaValue | | 2 | |
| Tag | | 16 | |
| Address[51:6] | | 46 | |
| Posion | | 1 | |
| BEP | 0 | | 1 |
| LD-ID[3:0] | 4 | | 0 |
| SPID | 0 | | 12 |
| DPID | 0 | | 12 |
| RSVD | 6 | | 22 |
| TC | | 2 | |
| Total | 87 | 104 | 124 |

FIG. 5

DIFFERENTIATED QOS IN PARALLEL CACHED RAS CHANNELS IN MEMORY DEVICES

CROSS-REFERENCE TO RELATED APPLICATION

This application claims benefit to U.S. Provisional Patent Application No. 63/485,789, filed Feb. 17, 2023, the disclosure is incorporated herein by reference in its entirety.

FIELD OF TECHNOLOGY

The present disclosure relates to reliability, availability, and serviceability (RAS) features for memory media. In particular, the present disclosure relates to improving RAS capabilities and/or responsiveness to data requests when multiple memory media devices are connected to the same device.

BACKGROUND

Memory media (also referred to as memory media devices) are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), flash memory, and others. Memory devices may be volatile or non-volatile. Volatile memory cells (e.g., DRAM cells) may lose their programmed states over time unless they are periodically refreshed by an external power source. DRAM is organized as an array of storage cells with each cell storing a programmed value. SRAM memory may maintain their programmed states for the duration of the system being powered on. Non-volatile memory cells (e.g., Not-And (NAND) memory cells) may maintain their programmed states for extended periods of time even in the absence of an external power source.

RAS features are important considerations in many digital memory storage environments. The explosive growth of Internet content and the resulting data storage and computation requirements have resulted in the deployment of heterogeneous and sometimes complex data storage solutions in large-scale data centers, organizations, home computing environments, and even mobile computing environments. The increasing scale, intensity of use, criticality of applications etc. of such deployments bring their RAS capabilities into increasing focus.

In some conventional deployments, even infrequent errors start to become visible as the aggregate volume of components and bits stored or transferred continue to increase. As the number of repair events that require replacing hardware should be kept to an absolute minimum, there is the need to identify failing components clearly and definitively, and minimize the time spent in repair.

Reliability is the ability to provide correct service. One way to design a system to be reliable is to be able to detect and correct faults that may otherwise cause an error. An example of such a design is to use Error Correcting Codes (ECC) to detect a fault at a specific location in memory and correct it before the data stored in that location is consumed by a processor. Reliability is often expressed in terms of Mean Time Between Failures (MTBF), Mean Time To Failure (MTTF), or Failures in Time (FIT).

Availability is the ability to be ready to provide correct service, possibly under degraded capability or performance. An approach to attaining availability is to recover from an error so that the service is not interrupted due to the error. Using the memory example above, if an error is detected but is not correctable by ECC, one may offline (retire) the physical page that contains that specific memory address in the operating system so that that no future data is allocated to that location. In case recovery is not successful and the machine crashes and resets itself, then this would result in some duration of downtime, implying the system is unavailable during such downtime. One way to quantify availability is in terms of the "number of nines". For example, an Availability of 5 nines implies the system is up 99.999% of the time, i.e., approximately 5.25 minutes of downtime over one year of system operation.

Serviceability is the ability to diagnose and repair faults that may cause (or may have caused) an error. For example, memory repair techniques that allow a memory location that has an uncorrectable permanent fault to be physically repaired by replacing it with a spare would provide for serviceability. Serviceability may be "online", where the system continues to be available, or "offline", where the system is not available while being serviced.

The specific mechanisms used to attain RAS may be a mixture of process technology, architecture, firmware, system software, libraries, and potentially application software. Designing for RAS for a multitude of use cases is enabled by standards such as, for example, the Compute Express Link™ (CXL™) ecosystem, that standardization of certain canonical RAS features, a high degree of visibility into errors and other RAS-related events within a set of components interconnected by the CXL fabric, and the ability to log and communicate these events in a standardized manner to the host to enable RAS actions at the platform level and within operational flows at the data center level.

CXL specifies standards for SoC, memory, storage, networking, etc. CXL enables a system vendor to populate memory devices, with differing internal architectures and media technologies in the same platform. One could also populate different coherent accelerators, each with a potentially different type of local memory and from different vendors. The CXL standard defines multiple RAS features, enabling all members within this rich, heterogenous ecosystem to innovate in their domains and still interoperate ultimately leading to RAS design points that meet the current and emerging end-user requirements.

Memory media failures can be classified in 2 classes—random (e.g., single bit) errors and periphery errors. Random errors can be soft errors or hard errors and can be in memory array or on the data link. Periphery errors are caused by such aspects as, for example, neutron strikes, defects in latches, metal contamination, and imbalance in sense amplifiers. As noted above, system resilience is typically determined in accordance with the RAS criteria.

According to RAS criteria, reliability from random and periphery errors is provided by 3 mechanisms: ECC—works on payloads composed of bits coming from a single memory media die; low power chipkill (LPCK)—corrects an entire die failure and provides countermeasure for periphery errors in the media; and cyclic redundancy check (CRC)—protects CXL link and avoids error reaching the host.

In view of the above-described importance of RAS capabilities in memory media, improved solutions for providing such capabilities are needed.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

FIG. 5 illustrates example CXL request headers modified to support virtual channel implementation according to some embodiments of the present disclosure.

DETAILED DESCRIPTION

Memory solutions in which multiple memory media devices are incorporated in, or are associated with, one memory device are growing in scale and importance. With such growth, the effective implementation of RAS capabilities in such memory solutions become increasingly important.

Some embodiments of the present disclosure provide RAS channel data path arrangements and differentiated quality of service (differentiated quality of service (QoS)) in memory devices. Some embodiments provide for a respective RAS controller (RAS channel) for each group of one or more memory media. Some embodiments provide CXL-compliant memory devices that take advantage of the RAS capabilities of CXL. Some embodiments incorporate cache arrangements in the memory devices to provide improved responsiveness to memory requests.

Example embodiments may be used in accessing many types of memory media, such as, for example various types of DRAM, SRAM etc., but may be particularly advantageous in memory devices that incorporate media such as low power double data rate memory (e.g., LPDDR5).

LPDDR5 types of memory are generally accessed by relatively narrow channels, and thus, receiving RAS information with the data (e.g., ECC as a sideband channel with the data channel) is not possible. A typical data request is 32 bytes or 64 bytes. Because there is no way to return only a few bytes of ECC (e.g., 8 bytes ECC is typical for 64 bytes of data) along with the 64 bytes of requested data in LPDDR5, LPDDR5 conventionally operates by returning 64 bytes of ECC for every requested 64 bytes of data. This effectively halves the link bandwidth/memory bandwidth.

Since ideally for 64 bytes of data only 8 bytes of ECC is necessary, the inability to control the granularity leads to waste in conventional implementations. Some embodiments, since too much of ECC (i.e., 64 bytes of ECC when only 8 bytes is needed) is received from the LPDDR5 media for 64 bytes data, rather than waste the extra ECC, additional data blocks that correspond to the already fetched additional ECC are fetched. The additional data blocks are written to a cache to improve the response times for some subsequent data requests.

Figure 1A:
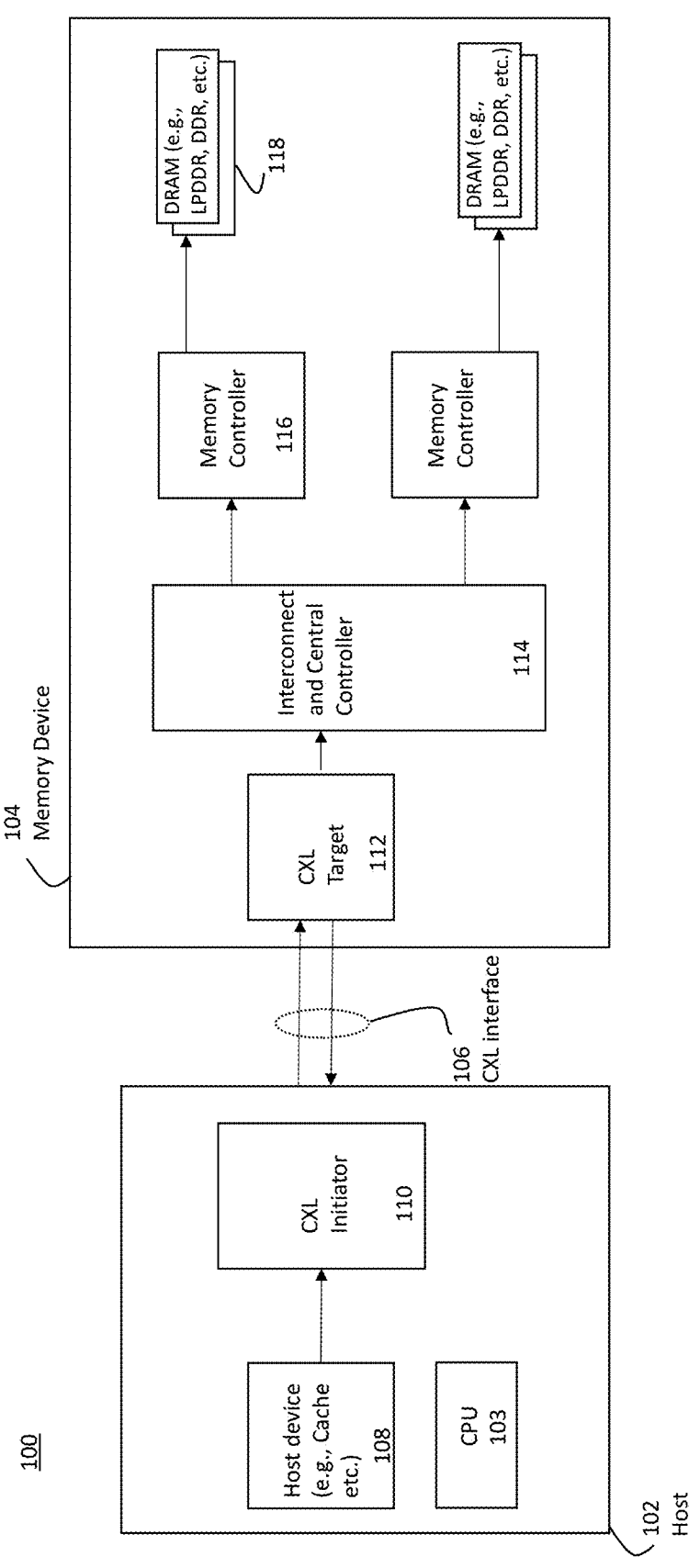
FIG. 1A illustrates an example functional block diagram of a computing system including an interface host device, an interface target device, and a communication interface (e.g., CXL interface) connecting the host and target devices that are configured to provide RAS services and/or differentiated quality of service in accordance with some example embodiments of the present disclosure.

FIG. 1A illustrates an example functional block diagram of a computing system 100 that includes an interface host device 108, an interface target device 112, and a communication interface 106 connecting the host and target devices that are configured to improve response times for data requests and/or provide improved RAS capabilities in accordance with some example embodiments of the present disclosure.

According to an embodiment, communication interface 106 is a CXL interface that is configured to connect the CXL initiator 110 (also referred to as CXL host or CXL master) and CXL target 112 (also referred to as CXL slave) in accordance with, for example, the CXL 2.0 and/or CXL 3.0 protocol specifications. Example embodiments, however, are not limited to the mentioned versions of CXL, or to the CXL protocol.

Host 102 may be a computer or the like with one or more processors 103 (e.g., central processing unit (CPU), graphics processing unit (GPU), application specific integrated circuit system (ASIC), field programmable gate array (FPGA), or another type of processor). Host 102 may further include a host device 108 such as a cache memory.

Host 102 may be configured to access a device, such as a memory device 104. Memory device 104 may include one or more memory media modules 118 such as DRAM modules which may be LPDDR, DDR, or other type of DRAM. The memory device 104 may be configured as the main memory, or some other memory, of the host 102. Example embodiments are not limited to DRAM, and may include memory devices 104 that have one or more modules including one or more of memory types of DRAM and SRAM.

The host 102 and the memory device 104 communicate via communication interface 106. Communication interface 106 comprises two unidirectional links, one unidirectional link on which the host 102 transmits messages to the memory device 104 and another unidirectional link on which the memory device 104 transmits messages to the host 102.

Each message to be transferred between host 102 and memory device 104 over link 106 can be broken down into smaller chunks of data structures called packets. In the examples described in this disclosure, each packet may in turn be broken down into message flow control units or flits. A flow control mechanism may decide which message gets to flow and which message is held back.

A flit (flow control unit) is a link-level data structure that forms a network packet or stream. For an example of how flits work in a network, an example of how packets are transmitted in terms of flits can be considered. A packet transmitting between A and B may happen in the following steps: The packet will be split into flits C, D and E; the transmit buffer in A will load the first flit C and send it to B; after B receives C, A moves the C out of the transmit buffer; the transmit buffer in A then loads the next flit D and sends it to B; and keep performing the above steps until all flits have been sent to B. B then combines all the flits to generate the packet.

The communication via flits between the host 102 the memory device 104 may be carried out in accordance with a standard protocol. CXL is a dynamic multi-protocol technology designed to support accelerators and memory devices. In the CXL protocol, CXL Link Layers (the link layer) is responsible for reliable transmission of transaction layer packets (TLP) across a Flex Bus link. CXL provides a rich set of protocols that include I/O semantics similar to Peripheral Component Interconnect Express (PCIe) (i.e., CXL.io), caching protocol semantics (i.e., CXL.cache), and memory access semantics (i.e., CXL.mem) over a discrete or on-package link. CXL.io is required for discovery and enumeration, error report, and host physical address (HPA) lookup. CXL.mem and CXL.cache protocols may be optionally implemented by the particular accelerator or memory device usage model.

As noted above, the flit is a unit amount of data when the message is transmitting at link-level. According to the CXL protocol, a flit can be accepted or rejected at the receiver side based on the flow control protocol and the size of the receive buffer. The mechanism of link-level flow control allows the receiver to send a continuous signals stream to the transmitter to control if it should keep sending flits or stop sending flits. When a packet is transmitted over a link, the packet will often need to be split into multiple flits before the transmitting begins.

For CXL.cache and CXL.mem, layouts, such as, for example, a 528-bit flit layout is specified. Flit packing rules for selecting requests from internal queues to fill the available slots (e.g., 3 slots per flit in one example CXL implementation, 16 slots in another example CXL implementation) in the flit are also specified. Other features described for CXL.cache and CXL.mem include a retry mechanism, link layer control flits, CRC calculation, and viral and poison. A key benefit of CXL is that it provides a low-latency, high-bandwidth path for an accelerator to access the system and for the system to access the memory attached to the CXL device.

Flex Bus provides a point-to-point interconnect that can transmit native PCIe protocol or dynamic multi-protocol CXL to provide I/O, caching, and memory protocols over PCIe electricals. The primary link attributes include support of the following features: native PCIe mode, full feature support as defined in the PCIe specification; CXL mode, as defined in this specification; Configuration of PCIe vs CXL protocol mode; Signaling rate of 32 GT/s, degraded rate of 16GT/s or 8 GT/s in CXL mode; Link width support for ×16, ×8, ×4, ×2 (degraded mode), and ×1 (degraded mode).

According to some embodiments, communication interface 106 is configured to operate in accordance with the CXL standard. When operating as a CXL interface based on PCIe 5.0/6.0, communication interface 106 comprises a pair of unidirectional links—each contributing to system bandwidth. CXL 2.0 provides an interface which leverages PCIe 5.0 (32GT/s), and CXL 3.0 leverages PCIe 6.0 (64GT/s) in each direction. According to some embodiments in which the communication interface 106 operates in accordance with CXL, the memory device 104 is a CXL Type 3 device.

That is, the interface operates in a host-target (also referred to as master-slave) mode in which the CXL initiator 110 in host 102 operates as host and the CXL target 112 in the memory device 104 operates as target. In other words, in these embodiments, in which the memory device is a CXL Type 3 device, all requests (e.g., read requests and write requests) are initiated by the host 102 and the memory device 104 responds to such requests. Example embodiments, however, are not limited to host-target configurations.

Multiple requests and data are transported over the communication interface 106 flits, which, in some embodiments, are fixed width flits. The host device (e.g., CXL Initiator) is responsible for generating requests to the memory device (e.g., CXL target). The memory device has a CXL controller to unpackage the flit requests incoming from the host and forwards the requests to the backend memory media (e.g., DRAM). Each flit in CXL 2.0 is of 528bits (4 slots each of 16B+2 bytes for CRC=66B or 528 bits).

Each flit in CXL 3.0 is of 256B (16 slots each of 16B where 238B in each flit is for TLP Payload and 18B is for CRC and FEC). In some embodiments, in CXL 3.0, 15 out of the 16 slots can be used for multiple requests and data. In example embodiments, the controllers 110 and 112 are configured to implement the functionality required by CXL. For example, controllers 110 and 112 operate to package messages or TLP into flits for transmission over communication interface 106, and to unpack flits received over the communication interface 106 to obtain the transmitted messages.

As noted above, in some embodiments, memory device 104 is a CXL-compliant memory system (e.g., the memory system can include a PCIe/CXL interface). CXL is a high-speed CPU-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost. CXL is designed to be an industry open standard interface for high-speed communications, as accelerators are increasingly used to complement CPUs in support of emerging applications such as artificial intelligence and machine learning.

CXL technology is built on the PCIe infrastructure, leveraging PCIe physical and electrical interfaces to provide advanced protocol in areas such as I/O protocol, memory protocol (e.g., initially allowing a host to share memory with an accelerator), and coherency interface. When memory device 104 is CXL compliant, the interface management circuitry in the CXL controller 112 (including data link and transaction control) uses CXL protocols to manage the communication interface 106 which may comprise PCIe PHY interfaces.

According to some embodiments, memory media modules 118 includes one or more DRAM devices, which, as noted above, may be of a type such as DDR, LPDDR, etc. without limitation. In some embodiments, the main memory for computer system 100 is stored in DRAM cells that have high storage density. DRAM cells lose their state over time. That is, the DRAM cells must be refreshed periodically, hence the name Dynamic. DRAM can be described as being organized according to a hierarchy of storage organization comprising dual in-line memory module (DIMM), rank, bank, and array.

A DIMM comprises a plurality of DRAM chips, and the plurality of chips in a DIMM are organized into one or more ranks". Each chip is formed of a plurality of banks. A bank is formed of one or more rows of the array of memory cells. All banks within the rank share all address and control pins. All banks are independent, but in some embodiments only one bank in a rank can be accessed at a time. Because of electrical constraints, only a few DIMMs can be attached to a bus. Ranks help increase the capacity on a DIMM.

Multiple DRAM chips are used for every access to improve data transfer bandwidth. Multiple banks are provided so that the computing system can be simultaneously working on different requests. To maximize density, arrays within a bank are made large, rows are wide, and row buffers are wide (8 KB read for a 64B request). Each array provides a single bit to the output pin in a cycle (for high density and because there are few pins). DRAM chips are often described as xN, where N refers to the number of output pins; one rank may be composed of eight x8 DRAM chips (e.g., the data bus is 64 bits). Banks and ranks offer memory parallelism, and the memory device 104 may schedule memory accesses to maximize row buffer hit rates and bank/rank parallelism.

In some embodiments, the memory media modules 118 is low power double data rate (LPDDR) LP5 or other similar memory interfaces. However, embodiments are not limited thereto, and memory media modules 118 may comprise one or more memory media of any memory media types, such as, but not limited to, types of DRAM.

The memory device 104 can include a plurality of memory controllers 116 that each control a group of one or more memory media devices 118. Each of the plurality of memory controllers 116 can receive the same command (e.g., command to read or write memory media modules 118) and address and drive the plurality of channels connecting to the memory media substantially simultaneously. By using the same command and address for the plurality of media controllers, each of the plurality of memory controllers 116 can utilize the plurality of channels to perform the same memory operation on the same plurality memory cells. Each media controller 118 can correspond to a RAID component. As used herein, the term substantially intends that the characteristic need not be absolute but is close enough so as to achieve the advantages of the characteristic.

For example, "substantially simultaneously" is not limited to operations that are performed absolutely simultaneously and can include timings that are intended to be simultaneous but due to manufacturing limitations may not be precisely simultaneously. For example, due to read/write delays that may be exhibited by various interfaces (e.g., LPDDR5 vs. PCIe), media controllers that are utilized "substantially simultaneously" may not start or finish at exactly the same time. For example, multiple memory controllers can be utilized such that they are writing data to the memory devices at the same time, regardless of whether one of the media controllers commences or terminates prior to the other.

A frontend portion of memory device 104 includes the CXL target 112 and an interconnect and central controller 114 (e.g., CXL interconnect, crossbar) to couple the one or more memory controllers 116 to the host device 102 through one or more input/output (I/O) lanes of communication interface 106. The communications over I/O lanes may be according to a protocol such as, for example, PCIe. In some embodiments, the plurality of I/O lanes can be configured as a single port. Example embodiments may not be limited by the number of I/O lanes, whether the I/O lanes belong to a single port, or the communication protocol for communicating with the host.

Communication interface 106 receives data and/or commands from host device initiator 110 through one or more I/O lanes. In an embodiment, communication interface 106 is a physical (PHY) interface configured for PCIe communications. The host CXL initiator 110 and the CXL target 112 include interface management circuitry (including data link and transaction control) which provides higher layer protocol support for communications with each other through the type of PHY interface in the communication interface 106.

Memory device 104 includes memory controllers 116 and other circuitry to control, in response to receiving a request or command from host 102, performance of a memory operation. The memory operation can be a memory operation to read data from, or write data to, memory media modules 118.

Memory device 104 may also comprise a security component configured to encrypt the data before storing, and to decrypt data after reading, the data in memory media modules 118. In some embodiments, memory device 104 may also include a cache memory to store data associated with the performance of the memory operations.

In some embodiments, in response to receiving a request from host 102, data read from or written to memory media modules 118 can be stored in cache lines of a cache memory on the memory device 102. The data in the cache memory can be written to memory media modules 118. In some embodiments, an error correction component on the memory device is configured to provide error correction to data read from and/or written to memory media modules 118. In some embodiments, the data can be encrypted using an encryption protocol such as, for example, Advanced Encryption Standard (AES) encryption, before the data is stored in the cache memory.

A management unit located in the memory device 104 may be configured to control operations of the memory device 104. The management unit may recognize commands from the host 102 and accordingly manage the one or more memory media modules at 118. In some embodiments, the management unit includes an I/O bus to manage out-of-band data, a management unit controller to execute a firmware whose functionalities include, but not limited to, monitoring and configuring the characteristics of the memory device 104, and a management unit memory to store data associated with memory device 104 functionalities. The management unit controller may also execute instructions associated with initializing and configuring the characteristics of memory device 104.

A backend portion of memory device 104 is configured to couple to one or more types of memory media (e.g., DRAM media 118) via (e.g., through) a plurality of channels, which can be used to read/write data to/from the memory media modules 118, to transmit commands to memory media modules 118, to receive status and statistics from memory media modules 118, etc. The management unit can couple, by initializing and/or configuring the memory device 104 and/or the memory media modules 118 accordingly. The memory device 104 to external circuitry or an external device, such as host 102 that can generate requests to read or write data to and/or from the memory media. The management unit is configured to recognize received commands from the host 102 and to execute instructions to apply a particular operation code associated with received host commands for each of a plurality of channels coupled to the memory media modules 118.

The backend portion includes a media controller portion comprising one or more memory controllers 116 and a PHY layer portion comprising a plurality of PHY interfaces connecting the media controllers to the memory media. In some embodiments, the backend portion is configured to couple the PHY interfaces to a plurality of memory ranks of the memory media modules 118. Memory ranks can be connected to the memory controller(s) 116 via a plurality of channels. A respective media controller 116 and a corresponding PHY interface may drive a channel to a memory rank. In some embodiments, each media controller 116 can execute commands independent of the other memory controllers 116. Therefore, data can be transferred from one PHY interface through a channel to memory media modules 118independent of other PHY interfaces and channels.

Each PHY interface may operate in accordance with the PHY layer that couples the memory device 104 to one or more memory ranks in the memory media modules 118. As used herein, the term PHY layer generally refers to the physical layer in the Open Systems Interconnection (OSI) model of a computing system. The PHY layer may be the first (e.g., lowest) layer of the OSI model and can be used to transfer data over a physical data transmission medium. In some embodiments, the physical data transmission medium can be a plurality of channels.

As used herein, the term memory ranks generally refer to a plurality of memory chips (e.g., DRAM memory chips) that can be accessed simultaneously. In some embodiments, a memory rank can be sixty four (64) bits wide and each memory rank can have eight (8) pages. In some embodiments, a page size of a first type of memory media device can be larger than a page size of the second type of memory media device. Example embodiments, however, are not limited to particular widths of memory ranks or page sizes.

Each media controller may include a channel control circuitry and a plurality of bank control circuitry where a respective one of the plurality of bank control circuitry is configured to access a respective bank of the plurality of banks on the memory media module 118 accessed by the respective media controller 116.

Rank, channel, and bank can be considered hardware-dependent logical groupings of storage locations in the media device. The mapping of rank, channel and bank logical groupings to physical storage locations or rows in the memory media device may be preconfigured, or may be configurable, in some embodiments by the memory controller in communication with the memory media modules 118.

Figure 1B:
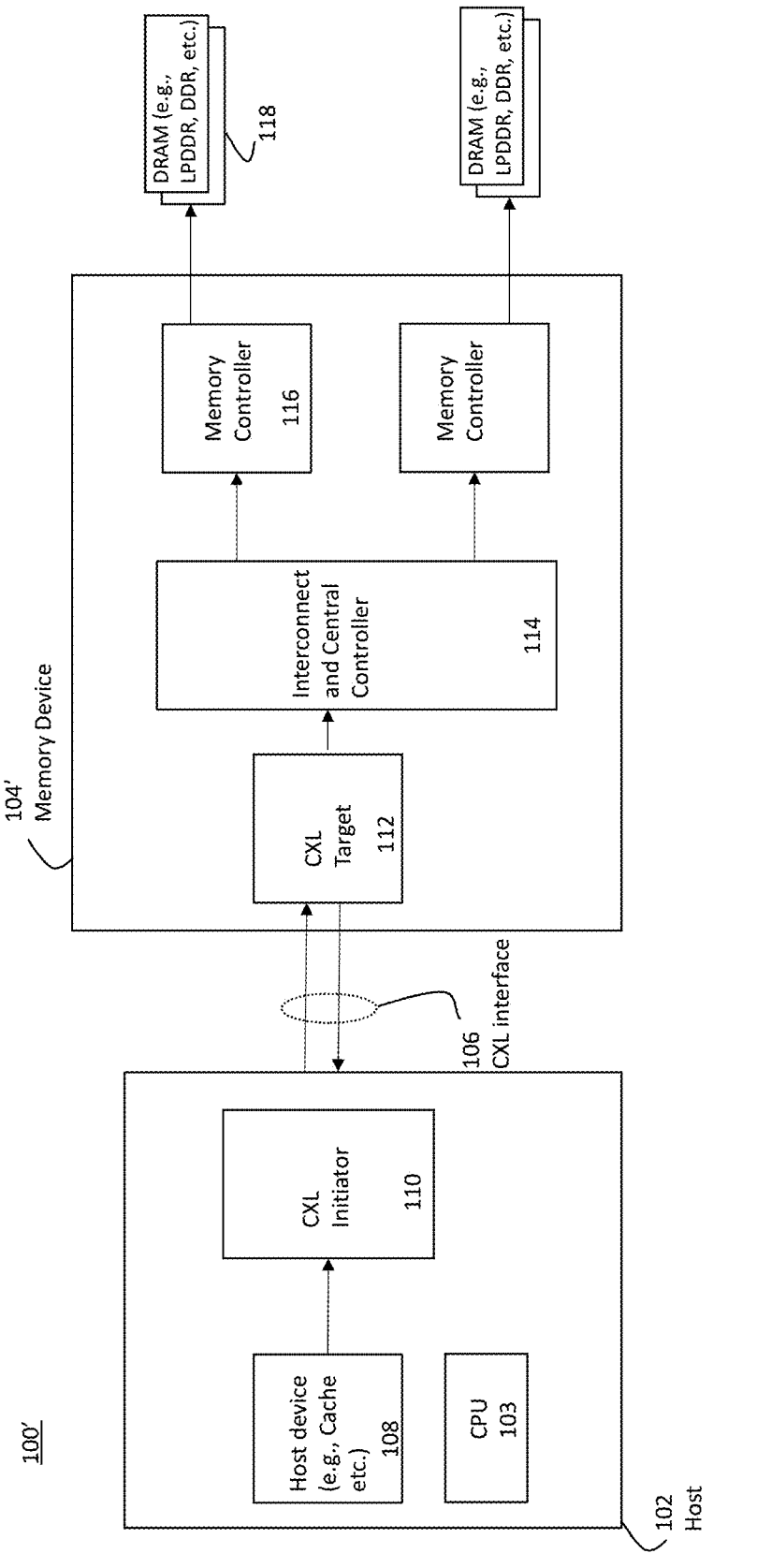
FIG. 1B illustrates an example functional block diagram of another computing system including an interface host device, an interface target device, and a communication interface (e.g., CXL interface) connecting the host and target devices that are configured to provide RAS services and/or differentiated quality of service in accordance with some example embodiments of the present disclosure.

FIG. 1B schematically illustrates another system 100' according to some example embodiments. System 100' may be identical to system 100 shown in FIG. 1A except that the memory media modules 118 are not incorporated in the memory device but are connectable to the device 104' via respective PHY interfaces (not shown in FIG. 1B).

In existing memory devices, such as, for example, existing CXL-based memory devices that provide access to a plurality of memory media devices, the RAS processing on the memory device is carried out in a manner that is common to the multiple memory media devices. That is, a single RAS processing module is provided for the memory device, and that single RAS module handles RAS processing for all media devices connected to that memory device. This leads to issues such as being unable to quickly identify the particular media device for which an error was caused, head-of-line blocking when accessed to one media device is experiencing errors, etc.

Example embodiments of the present disclosure provide memory device 104 with a plurality of RAS datapaths so that each individual media device, or each group of a small number of media devices, includes its dedicated RAS datapath. Additionally, some embodiments provide for data accesses and corresponding responses to be accommodated in virtual circuits based on respective RAS datapaths. Still further, some embodiments include one or more caches in the memory device to improve the performance, in particular, response times for incoming memory access requests, when accessing the media devices.

It is desirable that the number of outstanding requests in a CXL target controller is kept minimal to reduce the overall pin-pin latency of CXL target device. To achieve this, when a cache is included in the path of a RAS channel, the cache and the backend media controller should be kept in unloaded condition. One way to achieve this is to have parallel access to media and thereby limit the number of congestion points. A single cache as interface between the CXL frontend and multiple RAS channels can be a congestion point. Having multiple caches for the multiple RAS channels can help in removing the congestion on central cache controller subsystems.

Furthermore, multiple caches provide more aggregate storage and hit ratios of cache lines than a single cache memory without a performance impact of searching within a larger single cache memory. The cache may be sized so that it provides sufficient space to store additional data according to service certain access patterns while also not being over provisioned. Multiple caches may be useful to reduce the possibility of cache becoming a bottleneck due to being filled by one RAS channel (or few RAS channels).

In conventional implementations, CXL traffic throttling is implemented at the frontend of the target device and does it for the entire device as a whole. Some embodiments provide higher granularity throttling. When one of the RAS channels and cache memory receives heavy traffic, the backend media or the corresponding cache may become saturated due to bandwidth limitation on each of these channels. Currently, CXL 2.0 or CXL 3.0 doesn't allow throttling traffic individually on these channels. Flow control credits on CXL link is one way to throttle the incoming traffic from CXL host. But this mechanism in conventional systems can only help in controlling requests on the entire CXL link as a whole.

Some embodiments provide finer granularity mechanisms of controlling the rate of incoming traffic from the host (throttling) for each RAS channel on the device and can avoid head-of-line blocking due to saturated channels.

Some embodiments provide virtual connections in the CXL controller, which can be used to service each RAS channel individually. These virtual channels may have their independent flow control credits per virtual channel-separate flow control credit mechanism for each virtual channel. Furthermore, if one of the RAS channel is oversubscribed, example embodiments provide for only throttling the incoming traffic from the host for this RAS channel alone. This will avoid head-of-line blocking due the saturated RAS channel and allow CXL link to still service other RAS channels which are unsaturated.

Figure 2A:
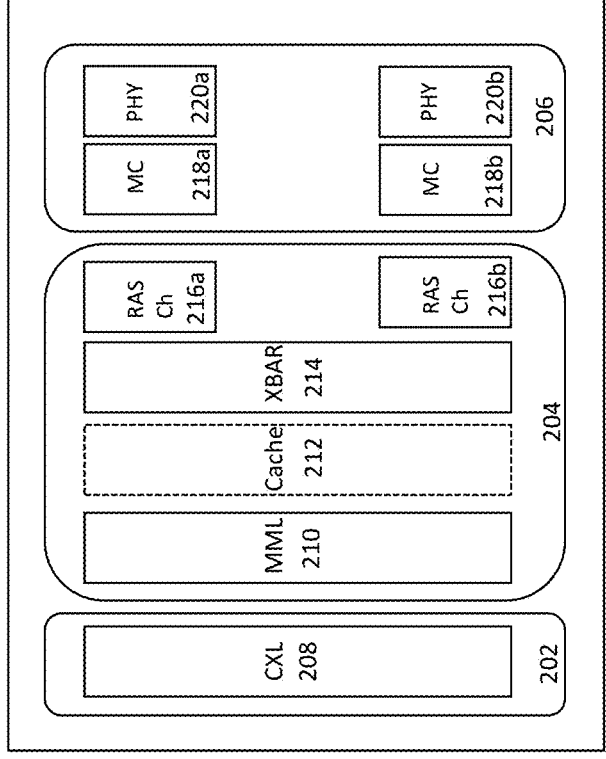
FIG. 2A schematically illustrates an arrangement of a frontend, central controller and backend of a target device that provides multiple RAS channels according to some embodiments of the present disclosure.
Figure 2B:
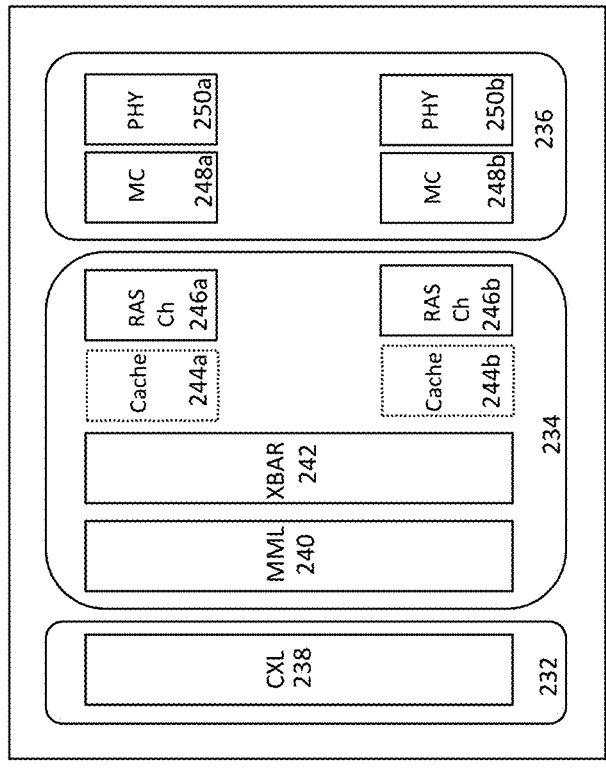
FIG. 2B schematically illustrates another arrangement of a frontend, central controller and backend of a target device that provides multiple RAS channels according to some embodiments of the present disclosure.
Figure 2C:
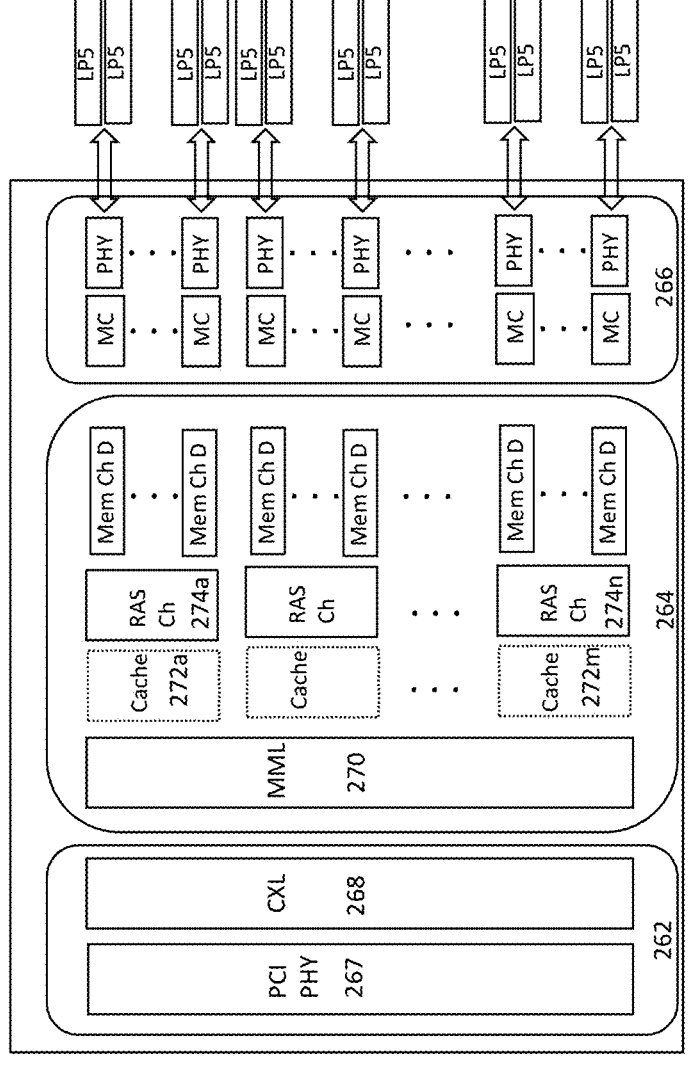
FIG. 2C schematically illustrates still another arrangement of a frontend, central controller and backend of a target device that provides multiple RAS channels according to some embodiments of the present disclosure.

FIGS. 2A, 2B and 2C illustrate different configurations of components within example memory devices, such as memory devices 104 or 104', according to some embodiments. Each of the different configurations includes a plurality of RAS channel datapaths so that each individual, or group of small number of, media devices is serviced by a respective one of the RAS channel datapaths. In addition to the parallel RAS channels, each of the different configurations also includes at least one cache. In example embodiments, the parallel RAS channel datapaths, and caches, media controllers, PHY interfaces associated with each RAS channel datapath includes dedicated hardware circuitry.

FIG. 2A schematically illustrates a memory device 200, according to some embodiments. Similar to memory device 104', memory device 200 may provide for a host (e.g., host 102) to access a plurality of media devices (e.g., memory media modules 118).

Memory device 200 includes a frontend portion 202, a central controller 204 and a backend 206. The frontend portion 202 includes most of the functions of the CXL protocol and may, for example, include a CXL controller 208. In some embodiments, CXL controller 208 includes the functions described above in relation to target CXL controller 112.

The central controller 204 includes a media management layer (MML) 210, a cache 212, and a crossbar interconnect 214. The MML layer 210 may process requests and responses for CRC etc. The cache 212 may be any type of cache memory and is configured to operate as a cache for the connected media. The central controller 204 also includes respective RAS channel datapaths 216a and 216b (collectively 216) that each is configured to connect to a respective group of one or more media devices (e.g., such as media 118) via respective connection paths through backend 206.

The backend 206 includes respective memory channels 218a and 218b (collectively 218) and respective PHY interfaces 220a and 220b (collectively 220). According to some embodiments, PHY 220a and 220b may each connect to a respective one of a plurality of media devices. In some embodiments PHY 220a and 220b connect to respective groups of 2 or more media devices.

The CXL controller 208 may be configured to receive incoming an incoming flit (flow control unit), read the CXL headers and unpack the respective messages (e.g., data access requests, such as, for example, read requests or write requests) in the slots of the flit. The data access requests are then processed by the MML logic 210.

The cache 212 is then looked up for the requested data. If the requested data is found in the cache (i.e., cache hit), then that data is returned in response to the request.

If the data is not found in the cache (e.g., cache miss), then the cache memory circuitry 210 or the crossbar circuitry 212 may determine which RAS channel datapath 214 corresponds to the address of the requested data and requests the determined RAS channel datapath for the requested data.

The determined RAS channel 214 may then request the data from its associated media devices, via the media controller 216 and PHY 218 connected to the determined RAS channel.

In some embodiments, the RAS channel datapath 216 is configured to request additional data together with the requested data. The requested additional data and the requested data, when received from the media device, are then written to the cache and the requested data is returned in response to the request. Having additional data returned and written to cache along with requested data can improve data access request response times for many applications due, for example, to locality characteristics in the data access patterns of such applications.

The requesting of additional data can be particularly advantageous in some configurations. For example, some media types, such as, for example, LPDDR5, are accessed in blocks of 64 bytes but may not have sufficiently wide data channels to return the additional error check data (e.g., ECC) that is required by the RAS channel datapath. Therefore, LPDDR5 media devices may, in addition to returning 64 bytes of requested data in a first response message to a data access request, also return a second response message that includes error check data. However, the error check data required for the requested 64 bytes of data only is 8 bytes, which does not occupy the entire return channel.

Example embodiments can take advantage of this aspect by, instead of the target device requesting only a 64 byte of data from media in response to a data access request from the host, the target device requesting multiple blocks of data from the media such that the entirety of the requested data and the additional data can be provided with RAS processing using the ECC data received from the media in response to the request for data.

FIG. 2B schematically illustrates a memory device 230, according to some embodiments. Similar to memory device 104', memory device 230 may provide for a host (e.g., host 102) to access a plurality of media units (e.g., media 118).

Memory device 230 includes a frontend portion 232, a central controller 234 and a backend 236. The frontend portion 232 includes most of the functions of the CXL protocol and may, for example, include a CXL controller 238. In some embodiments, CXL controller 238 includes the functions described above in relation to target CXL controller 112.

The backend 236 includes respective memory channels 248a and 248b (collectively 248) and respective PHY interfaces 250a and 250b (collectively 250). According to some embodiments, PHY 250a and 250b may each connect to a respective one of a plurality of media devices. In some embodiments PHY 250a and 250b connect to respective groups of 2 or more media devices.

The frontend 232 and backend 236 may be identical to the frontend 202 and backend 206, respectively, described above in relation to FIG. 2A. Additionally, MML layer 240 and RAS datapaths 246 may be identical to the MML layer 210 and RAS datapaths 216, respectively, described above in relation to FIG. 2A.

In central controller 234, the cache 244 is configured in a different manner than in the central controller 204 of FIG. 2A. The cache 244 comprises a first cache 244a dedicated to RAS channel datapath 246a and a second cache 244b dedicated to RAS channel datapath 246b.

When a data request is received in central controller 234, the MML 240 or the crossbar 242 determined which cache 244 is to be looked up and looks up only the determined cache 244a or 244b. This is different from the configuration in FIG. 2A, where every incoming data request causes a lookup of the entire cache 212 because cache 212 is the cache for all the media connected to target device 230.

FIG. 2C schematically illustrates a memory device 260, according to some embodiments. Similar to memory device 104', memory device 260 may provide for a host (e.g., host 102) to access a plurality of media devices (e.g., media devices 118).

Memory device 260 includes a frontend portion 262, a central controller 264 and a backend 266. The frontend portion 262 includes a PCI PHY 267 that connects the memory device 260 to the physical PCI link (e.g., link 106), and a CXL controller 268 that implements a portion of the CXL protocol that, for example, enables the memory device 260 to connect to a host (e.g., host 102) with CXL. In some embodiments, CXL controller 268 includes the functions described in relation to target CXL controller 112.

The central controller 264 is an arrangement of n separate caches 272 (272a . . . 272n) that are each configured to serve m RAS channels 274 (274a . . . 274m).

When a data request is received in the central controller 264, the MML 270 (which may have a crossbar incorporated therein) may determine one of the caches 272a . . . 272n to be looked up for the requested data. Upon being looked up, the respective caches 272a . . . 272n may function in a manner similar to caches 244 described in relation to FIG. 2B above and use one of the RAS channel datapaths 274 to access the media attached to that RAS channel datapath. In FIG. 2C, the RAS channel datapath is illustrated with separate memory channel datapaths for each media device attached to that RAS channel. Having a separate memory channel datapath for each media device enables the RAS channel datapath to distinguish between the attached media devices when performing RAS processing.

In some embodiments, the cache (e.g., 212, 244, 272, etc.) in the central controller may be optional.

Figure 3:
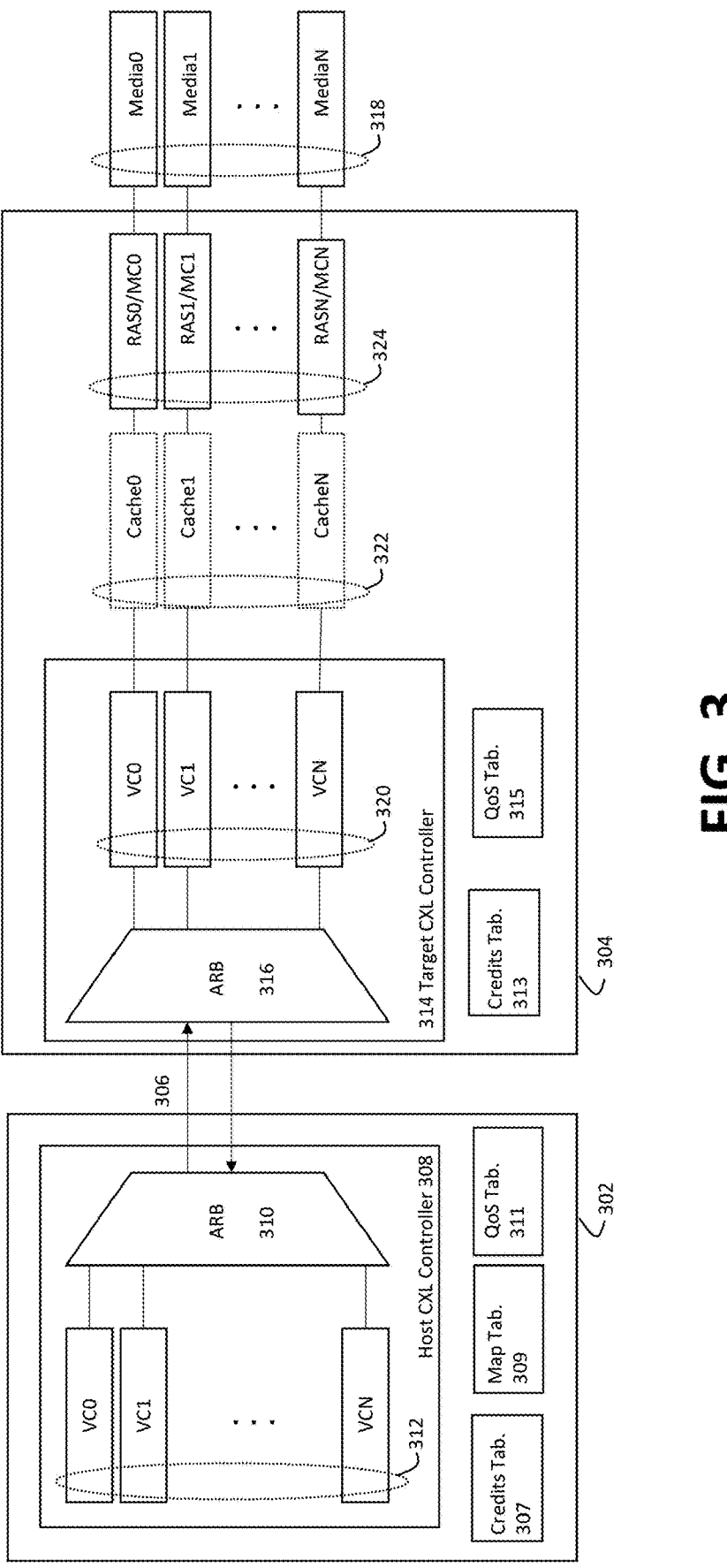
FIG. 3 schematically illustrates a virtual channel configuration in a host CXL controller and a target CXL controller, in accordance with some embodiments of the present disclosure.

FIG. 3 illustrates a virtual channel configuration between a host 302 and a memory device 304, according to some embodiments. The virtual channel configuration shown in FIG. 3 may be used, for example, in a memory device such as any of memory devices shown in FIGS. 2A-2C, by mapping a respective virtual channel to each RAS channel datapath.

By mapping each RAS channel datapath to a respective virtual channel, differentiated QoS can be provided on the basis of respective virtual channels. Thus, when the configuration is such that each RAS channel maps to a respective media device 318, different service levels can be provided to data requests and responses from the respective media devices 318.

At the host 302, in the host CXL controller 308, the arbiter 310 may be configured to select a virtual channel for each outgoing memory access request. For example, for each memory access request (e.g., read request or write request), the memory address associated with the request can be looked up in a mapping table 309 that maps each range of a plurality of ranges of memory addresses to one virtual channel from a plurality of virtual channels 312 VC0 . . . VCn.

The header of the memory access request may be updated to include the virtual channel identifier. FIG. 5 illustrates example CXL memory access request header structures that have been modified to include a virtual channel identifier field.

The arbiter 310 and/or another component of host CXL controller 308 may operate to pack memory access requests to the slots of the next flit in accordance with a differentiated QoS for the respective virtual channels. For example, each virtual channel may be associated with an amount of transmit credits and an amount of receive credits and the availability of credits may determine when requests for a particular virtual channel are packed into the next flit. The availability of credits for the respective virtual channels can be tracked in a credit counter table 307, and the differentiated QoS configurations for the respective virtual channels may be stored in table 311. Differentiated QoS configurations may be configured for one or more of maximum latency, average latency, bandwidth allocation, etc. for respective virtual channels.

The packed flits are transmitted on link 306 and are received at the memory device 304. The memory device's arbiter 316 or another component of the target CXL controller 314 receives the flit and unpacks the memory access requests. As noted above, the header of each request may include the identifier for its virtual channel. The arbiter 316 can provide differentiated QoS to each virtual channel on the basis of amounts of receive credits and transmit credits that are available for the respective virtual channels.

The requests are demultiplexed into the respective virtual channels based on the virtual channel identifiers in the respective headers and buffered in respective buffers 320 in accordance with the corresponding virtual channel. For each request, the corresponding cache 322 is looked up. As noted above, a cache miss causes the corresponding (i.e., corresponding to the virtual channel) media device 318 to be accessed for a block of data that includes the requested data. As noted above, in some embodiments, the response provided to the request includes multiple blocks of 64-byte data and one 64 byte ECC. For example, the 64 bytes of ECC includes 8 bytes of ECC for each of 8 64-byte data blocks. The requests to the media can be generated and/or transmitted over the corresponding RAS channel/media controller 324.

A scenario may be described in relation to differentiated QoS for the respective virtual channels. During operation of the system, for example, the input buffer for virtual channel 0 may have its fill level exceed a preconfigured threshold (e.g., 100%, 80%, etc.) while the other input buffers in the plurality of input buffers 320 have not reached their fill level thresholds. The target CXL controller may then inform, through control of credits or through separate communication of QoS telemetry, the host CXL controller that virtual channel 0 is saturated. This backpressure received for virtual channel 0 can enable the host to throttle requests for virtual channel 0 while not doing such throttling for the other virtual channels that have not been detected by the target as being saturated.

The target CXL controller 314 may control credit availability between the host and target based on the buffer occupancy of buffers 320, and the credit availability for the respective virtual channels can be tracked in a credit table 313. The control of credit availability may further be based on the differentiated QoS configurations specified in a QoS configuration table 315 for respective virtual channels.

Figure 4:
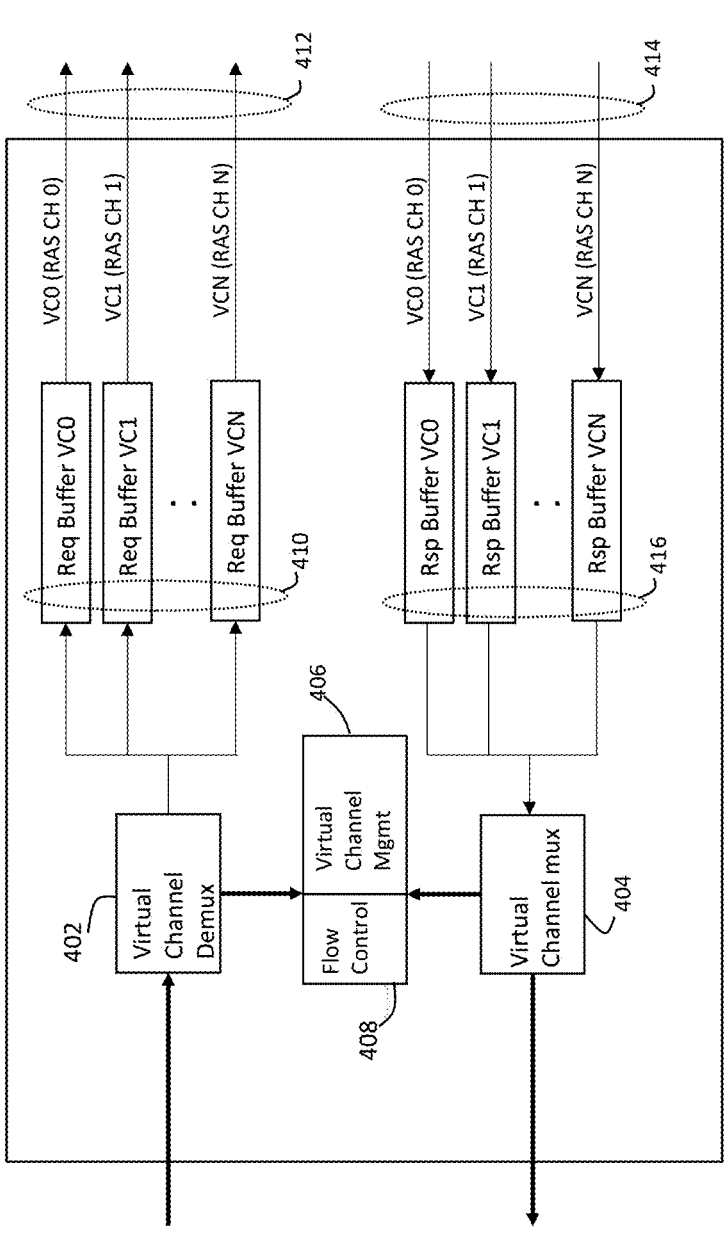
FIG. 4 schematically illustrates an arrangement of virtual channel processing modules in a target CXL controller, in accordance with some embodiments of the present disclosure.

FIG. 4 schematically illustrates a target device's CXL controller 400, such as, for example, the CXL controller 112 in FIG. 1A-1B, CXL controllers or target CXL controller 314 shown in FIG. 3, according to some example embodiments of the present disclosure. The processing illustrated in FIG. 4 may be implemented in the transaction layer of CXL.

Input flits are received in the target CXL controller 400 and the virtual channel demultiplex unit 402 identifies the virtual channel to which each read request or write request belongs based on the virtual channel identifier included in each of the request headers and buffers the respective requests in the corresponding one of the buffers 410. The virtual channel multiplex unit 402 logic can be implemented in the arbiter (e.g., arbiter 316) or as a separate component of a CXL controller (e.g., CXL controller 314).

The requests in each of the input buffers 410 may be processed in a FIFO manner in the respectively corresponding one of the processing path 412 for the corresponding virtual channel. Input buffers 410 includes a separate buffer for each virtual channel. The remainder of each virtual channel processing paths 412 includes a cache, RAS channel datapath, memory controller and physical interface to a media device.

The responses (e.g., read responses or write acks) that are generated by the corresponding cache or RAS channel are returned via corresponding virtual channel processing paths 414 to the output buffers 416. The output buffers 416 includes one buffer for each virtual channel. Each output buffer 416 can be processed in a FIFO manner.

Virtual channel multiplex unit 404 may be implemented in an arbiter (e.g., arbiter 316) or as a separate component in the CXL controller (e.g., CXL controller 314). The processing path 414 for responses include the physical interface to a media device, memory controller, RAS channel datapath, and cache. The response for each incoming request (e.g., write ack, read data) may be provided from the respective cache or RAS channel datapath to the corresponding buffer 416. The virtual channel multiplex unit 404 may pack the next flit (i.e., the flit being packed currently to be transmitted to the host) with responses from the respective buffers 416 in accordance with the transmit credit availability of each virtual channel.

The virtual channel management logic 406 may be configured to map virtual channel identifiers to respective buffers. The virtual channel management logic may also include configurations for individual differentiated QoS for respective virtual channels. The virtual channel management logic 406 may also include differentiated QoS configurations for one or more of maximum latency, average latency, bandwidth allocation, etc. for respective virtual channels.

Flow control logic 408 controls credits based on the receive credits, transmit credits, and buffer occupancy of buffers 410 and 416. When individual differentiated QoS configurations are specified for respective virtual channels, flow control logic 408 can further base its determination of credit levels for the respective virtual channels on the individual differentiated QoS configurations.

In an example embodiment, virtual channel demultiplexer 402, virtual channel multiplexer 404, virtual channel management module 406, flow control module 408, and buffers 410 and 416 are dedicated hardware resources for managing flow control credits and optional QoS telemetry for respective virtual channels for providing differentiated QoS.

FIG. 5 illustrates example CXL header data structures that can be modified for use in some example embodiments. The read request header 502 and the write request header 504 are shown as examples, but response headers can also be modified in a similar manner to include the virtual channel identifiers in example embodiments. The first column in each table identifies field names, and the second column specifies the field width in bits for each field in three types of flits (i.e., 68-byte flit, 256 byte flit, and 528 byte flit). As described above, each flit comprises a header, a plurality of slots for respective requests, and error correction information.

The "MemOpcode" field specified the operation code (e.g., the opcode defines type of request (read, write, etc.)) and the "address" field specifies the memory address associated with the opcode. Note that the "tc" field specifies an QoS service for the flit as a whole.

The reserved field 504 in the read request header 502 can be modified in example embodiments to include a 3-bit virtual channel identifier 506. In a similar manner the reserved field 514 in the write request header 512 can be modified to include a 3-bit virtual channel identifier 506.

The virtual channel identifier enables the target CXL controller to arbitrate between the incoming requests and assign each request to the input buffer (or processing path) for the corresponding virtual channel. A 3-bit virtual channel identifier enables 8 virtual channels to be configured between the host CXL controller and the target CXL controller. For example, a 3-bit virtual channel identifier field can be used to assign a respective virtual channel to each RAS channel datapath in a memory controller that has 8 RAS channels.

Figure 6:
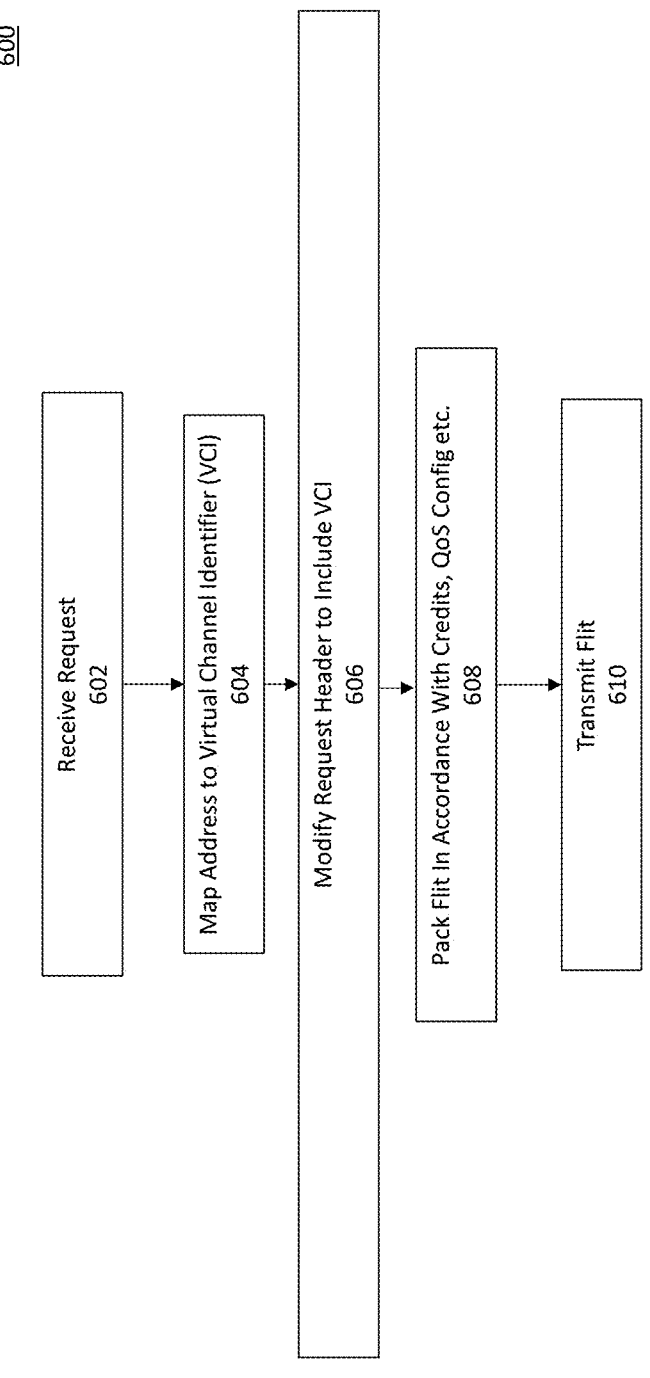
FIG. 6 illustrates a flowchart of a process performed at a host CXL controller in accordance with some embodiments of the present disclosure.

FIG. 6 illustrates a flowchart of a process 600 performed at a host CXL controller (e.g., host initiator 110 or host controller 308) in accordance with some embodiments of the present disclosure.

Process 600 may be started when the host CXL controller receives a message (e.g., read request or write request) to be transmitted to the target device (e.g., any of target device 104, 200, 230, 260, 304, or 400) connected over a communication link (e.g., link 106). At operation 602, a memory access request (e.g., read request or write request) is received by the host CXL controller.

At operation 604, the memory address associated with the memory access request is mapped to a virtual channel identifier. For example, a mapping table such as mapping table 309 can be looked up based on the memory address associated with the request. If a mapping entry exists for the memory address (e.g., the memory address is within the range of addresses specified in one of the mapping table entries), then the virtual channel identifier corresponding to that memory address is obtained. The virtual channel identifier can be any number or other identifier that is unique among all virtual channels.

At operation 606, the memory access request's header is modified to include the virtual channel identifier. For example, the CXL header of the memory access request can be modified such that the virtual channel identifier is included in the header. FIG. 5 shows example CXL headers which include a 3-bit VC_NUM field in a field that the CXL standards identified as reserved.

Subsequent to identifying the virtual channel to which the request belongs, the request is stored in a buffer (e.g., such as in one of the buffers 312) that temporarily stores memory access requests that are ready to be transmitted.

At operation 608, the flit is packed with memory access requests from the respective virtual channels. For example, the requests may be selected one or more of the buffers corresponding to the respective virtual channels. The packing may involve storing one of more slots of the flit with respective requests from the buffers. In some embodiments, the requests are selected for the flit in accordance with any of the respective buffer occupancies (e.g., buffer occupancy levels of each buffer 312), credit availability for each virtual channel, and differentiated QoS configurations for the respective virtual channels. Credit availability and differentiated QoS configurations can be determined from respective tables (e.g., credit availability table 307 and differentiated QoS configuration table 311).

At operation 610, the packed flit is transmitted. For example, the host initiator 110 transmits the flit on the link 106. The transmission of flits may occur at regular intervals and/or when a flit is fully packed.

Figure 7:
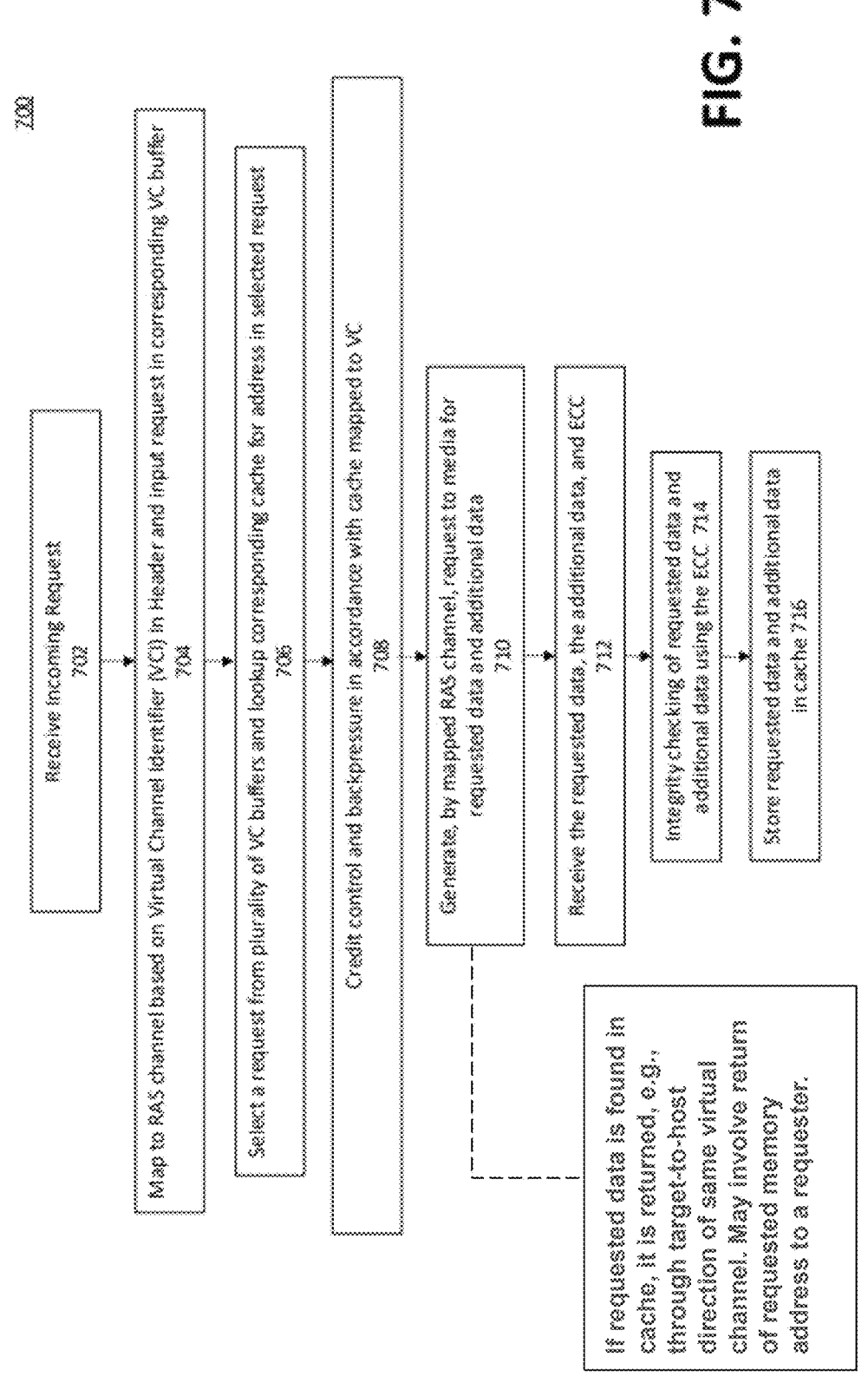
FIG. 7 illustrates a flowchart of a process performed at a target CXL controller in accordance with some embodiments of the present disclosure.

FIG. 7 illustrates a flowchart of a process 700 performed at a target CXL controller in accordance with some embodiments of the present disclosure.

Process 700 may be started when the target device's CXL controller (e.g., CXL controllers of any of target device 104, 200, 230, 260, 304 or 400) receives a request from a host CXL controller (e.g., host initiator 110or host controller 308) over an incoming link (e.g., link 106). The host CXL controller may be referred to as the originator for the flit. At operation 702, an incoming request is received in a flit.

At operation 704 the request is mapped to a virtual channel. The CXL header of the request includes a VC_NUM field that includes the virtual channel identifier of the virtual channel to which the request belongs. When the virtual channel is identified, the request can be inserted in an input buffer (e.g., one of the buffers 320).

At operation 706, a request can be selected from one of the pluralities of input buffers that each map to a virtual channel. It should be noted that in example embodiment, each virtual channel maps to a respective RAS channel datapath. In embodiments in which a cache is in the path of the selected virtual channel, the address associated with the selected request is looked up in the corresponding cache. For example, if the selected request maps to the virtual channel of the RAS channel 0/media controller 0 of the plurality of RAS channels 324 in the target device of FIG. 3, the cache 0 of the plurality of caches 320 is looked up for the address associated with the request. The selection may be performed in accordance with credit availability and/or differentiated QoS configuration for respective channels. For example, only virtual channels that have available receive credits may be considered for selecting a request. Further, for example, how often a particular virtual channel is considered for the selection of a request may be based upon its differentiated QoS configuration. The credit availability can be tracked in an available credit table (e.g., credit available table 313 in target device 304) and the differentiated QoS configurations of the respective virtual channels can be specified in a a differentiated QoS configuration table (e.g., differentiated QoS table 315 in target device 304).

At operation 708, credit control and/or backpressure can be implemented. For example, credits can be controlled based on the occupancy levels of the respective input buffers mapped to the respective virtual channels. When the occupancy level (saturation level) of a particular buffer is determined to be high (e.g., exceeded configured threshold), the flow control module (e.g., flow control module 408) may throttle the releasing of credits to the host, may throttle releasing credits to transmitting responses for the virtual channel corresponding to the particular buffer. The flow control module may also transmit QoS telemetry to the host indicating that the corresponding virtual channel is to be throttled. In a similar manner, the flow control module can operate to increase the flow of requests to one or more virtual channels. The decision to throttle or increase the flow of requests can, in addition to buffer occupancy and credit availability, be further based on QoS configurations specified for the respective virtual channels.

At operation 710, if the requested data is found in the cache, that data is returned, for example, through the target-to-host direction of the same virtual channel. If the requested data is not found in the cache, then the cache or the RAS channel datapath generates a request for the requested data and transmits the generated request to the corresponding media. For example, if in the embodiment shown in FIG. 3, a request is selected from VC0, then the address associated with the selected request is looked up in cache0.

In example embodiments, even if the request from the host requests a 64 byte block of data, the request to the media is issued for a larger amount of data. The request to the media may include the data requested by the host and additional data. In an embodiment, for each request received from the host for 64 bytes of data (requested data), the request to media may request 8×64 bytes (i.e., the 8×64 bytes includes 64 bytes of requested data and 7×64 bytes of additional data). The request for the larger amount of data is used as subsequently returning the requested data to the host, and to write the additional data received from the media to the cache.

In some embodiments, such as when the media is LPDDR5 memory, the channel width which may be 64 bytes, does not permit ECC information and the like that is required for RAS processing (in the RAS channel) cannot be returned with the 64 bytes of return data. Thus, as described above, in some embodiments, the media returns the requested data of 64 bytes and ECC data of 64 bytes. The ECC data returned includes 64 bytes of ECC data. Since in some embodiments only 8 bytes of ECC data is required for the 64 bytes of requested data (e.g., data requested by the host), the remaining 7×8 bytes of ECC data corresponds to the 7 blocks of additional data that is requested from the media.

At operation 712, in response to the request transmitted in operation 710, data and ECC data are received from the corresponding media. For example, the RAS channel datapath receives the 64 bytes of requested data, additional data, and ECC data for the requested data and the additional data. The ECC data is returned in one message. The requested data is returned in one message, and the additional data is returned in several messages.

At operation 714, the RAS channel datapath can perform integrity check on the receive data. The integrity check may be performed using the ECC data returned from the media in response.

At operation 716, the requested data is returned to the host and the requested data and the additional data is written to the cache.

It should be noted that in processes 600 and 700, one or more operations can be ordered differently than the order of operations described in relation to the drawings, one or more operations may be omitted, and/or one or more operations may be added. It should also be noted that in embodiments in which the central controller does not include caches to serve respective RAS channel datapaths, the lookup for the requested memory address is performed directly on an identified media, and the information obtained at the memory address is used to respond to the memory access request received from the host. Moreover, when virtual channels are not being used in example embodiments, no virtual channel identifier is included in the header, and the target controller determines the RAS channel datapath and media to access based on the memory address associated with the memory access request.

Processes 600 and 700 described above as implemented by a host CXL controller (e.g., CXL controller 110) and a target CXL controller (e.g., CXL controller 112), respectively, where the host transmits read requests and write requests to a CXL Type 3 target device. However, example embodiments are not limited thereto. Those skilled in the art will understand that the teachings of this disclosure are applicable to other configurations such as, for example, configurations that include target devices of other CXL device types.

Example embodiments enable individually controlling QoS for each virtual channel which can be configured to service an individual cache memory and consequently a RAS channel. This controlling can be either done through flow control credits for each virtual channel or a QoS telemetry feature implemented for each virtual channel. The individually controllable QoS provides differentiated QoS (bandwidth & latency) control knob for each RAS channel on the device.

Example embodiments help eliminate congestion points in the CXL architecture, enables differentiated QoS & telemetry services on respective virtual channels, and allow prioritization of traffic on selected virtual channels (e.g., virtual channels mapped to respective RAS channels). Example congestions points that can be avoided using example embodiments include head-of-line blocking due to saturated virtual channels which could be due to the backend media saturation. Example embodiments may avoid head-of-line blocking that may occur, for example, in the crossbar interconnecting the plurality of media devices to the target controller. The differentiated QoS capabilities may enable assigning fractional bandwidth to each virtual channel.

Example embodiments were described above primarily in relation to the CXL 2.0 and/or 3.0 specifications. Moreover, some of the described embodiments described a CXL Type 3 memory device communicating with a host. It will, however, be understood that embodiments are not limited to the CXL or the CXL versions that are specifically mentioned here. Moreover, example embodiments may be applicable to devices other than memory devices.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

It should be noted that the methods described above describe possible implementations, and that the operations and the steps may be rearranged or otherwise modified and that other implementations are possible. Further, portions from two or more of the methods may be combined.

For example, the various illustrative blocks and components described in connection with the disclosure herein may be implemented or performed with a general-purpose processor, a digital signal processor (DSP), an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory device comprising:

a plurality of memory media devices and a plurality of backend interfaces, wherein the backend interfaces are configured to connect to respective ones of the memory media devices;

a plurality of reliability, availability and serviceability (RAS) channel datapaths, wherein each of the RAS channel datapaths of the plurality of RAS channel datapaths is connected to one or more of the plurality of backend interfaces;

one or more caches, wherein at least one of the one or more caches is connected to at least one RAS channel datapath of the plurality of RAS channel datapaths; and control circuitry configured to:

search a given cache, of the one or more caches, for a requested memory location in response to receiving a memory access request from a host; and when the requested memory location is not found in the given cache during the search of the given cache, obtain the requested memory location from a given memory media device of the plurality of memory media devices, each given memory media device of the plurality of memory media devices including within its structure its own dedicated RAS channel datapath of the plurality of RAS channel datapaths also connected to the given cache;

wherein the control circuitry is further configured to, when obtaining a requested memory from the given memory media device:

obtain, from the given memory media device, a plurality of data blocks and one block of error correction data corresponding to the plurality of data blocks, wherein the requested memory location is in one of the plurality of data blocks;

integrity checking, by the dedicated RAS channel datapath, of the plurality of RAS channel datapaths, included within its memory media device, the plurality of data blocks using the one block of error correction data; and storing the plurality of data blocks in the one or more caches.

2. The memory device according to claim 1, wherein the search of the given cache comprises identifying the given cache based on a virtual channel, and wherein the given memory media device is mapped to the virtual channel.

3. The memory device according to claim 2, wherein the control circuitry is configured to determine the virtual channel in accordance with a virtual channel identifier in a protocol header of the memory access request.

4. The memory device according to claim 3, wherein the virtual channel identifier is determined by the host in accordance with a memory address associated with the memory access request.

5. The memory device according to claim 1, wherein the control circuitry is configured to, when, in response to the search, the requested memory location is found in the one or more caches, return the requested memory location to a requester.

6. The memory device according to claim 1, wherein the plurality of memory media devices comprise dynamic random access memory (DRAM) media devices.

7. The memory device according to claim 6, wherein the plurality of memory media devices comprise low power double data rate DRAM media devices.

8. The memory device according to claim 1, wherein each of RAS channel datapath of the plurality of RAS channel datapaths is mapped to a respective virtual channel of a plurality of virtual channels.

9. The memory device according to claim 8, further comprising credit control circuitry configured to separately control credits for each virtual channel of the plurality of virtual channels.

10. The memory device according to claim 9, wherein the credit control circuitry is configured to separately control the credits based on an occupancy level of at least one of a cache and respective buffers storing received memory access requests.

11. The memory device according to claim 9, wherein the credit control circuitry is configured to separately control the credits based on predetermined respective quality of service configurations for respective ones of the plurality of virtual channels.

12. The memory device according to claim 9, wherein the separate control of the credits is in accordance with a transaction layer function of a memory protocol.

13. The memory device according to claim 9, wherein the separate control of the credits includes communicating a credit availability level of a given virtual channel of the plurality of virtual channels to an originator of the memory access request.

14. The memory device according to claim 1, wherein the one or more caches comprise a plurality of caches, and wherein the plurality of caches are connected to respective ones of the plurality of RAS channel datapaths.

15. The memory device according to claim 1, wherein the memory access request is one of a plurality of requests in a flit received from the host, and wherein the control circuitry is configured to extract a header of the memory access request from a slot in the flit.

16. A method performed by control circuitry of a memory device, the method comprising:

in response to receiving, from a host, a memory access request for a memory location, searching a given cache, of one or more caches arranged on the memory device, for the requested memory location; and when, in response to the search, the requested memory location is not found in the given cache, obtaining the requested memory location from a given memory media device, each given memory media device including within its structure its own dedicated reliability, availability and serviceability (RAS) channel datapath of a plurality of RAS channel datapaths arranged on the memory device, wherein the memory device comprises a plurality of backend interfaces and a plurality of memory media devices including the given memory media device, each backend interface being configured to connect to a respective one of the plurality of memory media devices, wherein each of the plurality of RAS channel datapaths is connected to one or more of the plurality of backend interfaces, and wherein each of the one or more caches is connected to at least one of the plurality of RAS channel datapaths;

wherein the obtaining of the requested memory location from the given memory media comprises:

obtaining, from the given memory media device, a plurality of data blocks and one block of error correction data corresponding to the plurality of data blocks, wherein the requested memory location is in one of the plurality of data blocks;

integrity checking, by the dedicated RAS channel datapath of the plurality of RAS channel datapaths included within the structure of its memory media device, the plurality of data blocks using the one block of error correction data; and storing the plurality of data blocks in a given one or more caches, of the one or more caches, connected to the dedicated RAS channel datapath of the plurality of RAS channel datapaths.

17. The method according to claim 16, wherein said searching a given cache of the one or more caches arranged on the memory device for the requested memory location comprises identifying the cache for access based on a virtual channel, and wherein the media device is mapped to the virtual channel.

* * * * *